May 9, 1933.   J. L. HUTCHINGS   1,907,819
INDICATOR FOR VALVES
Filed June 25, 1931
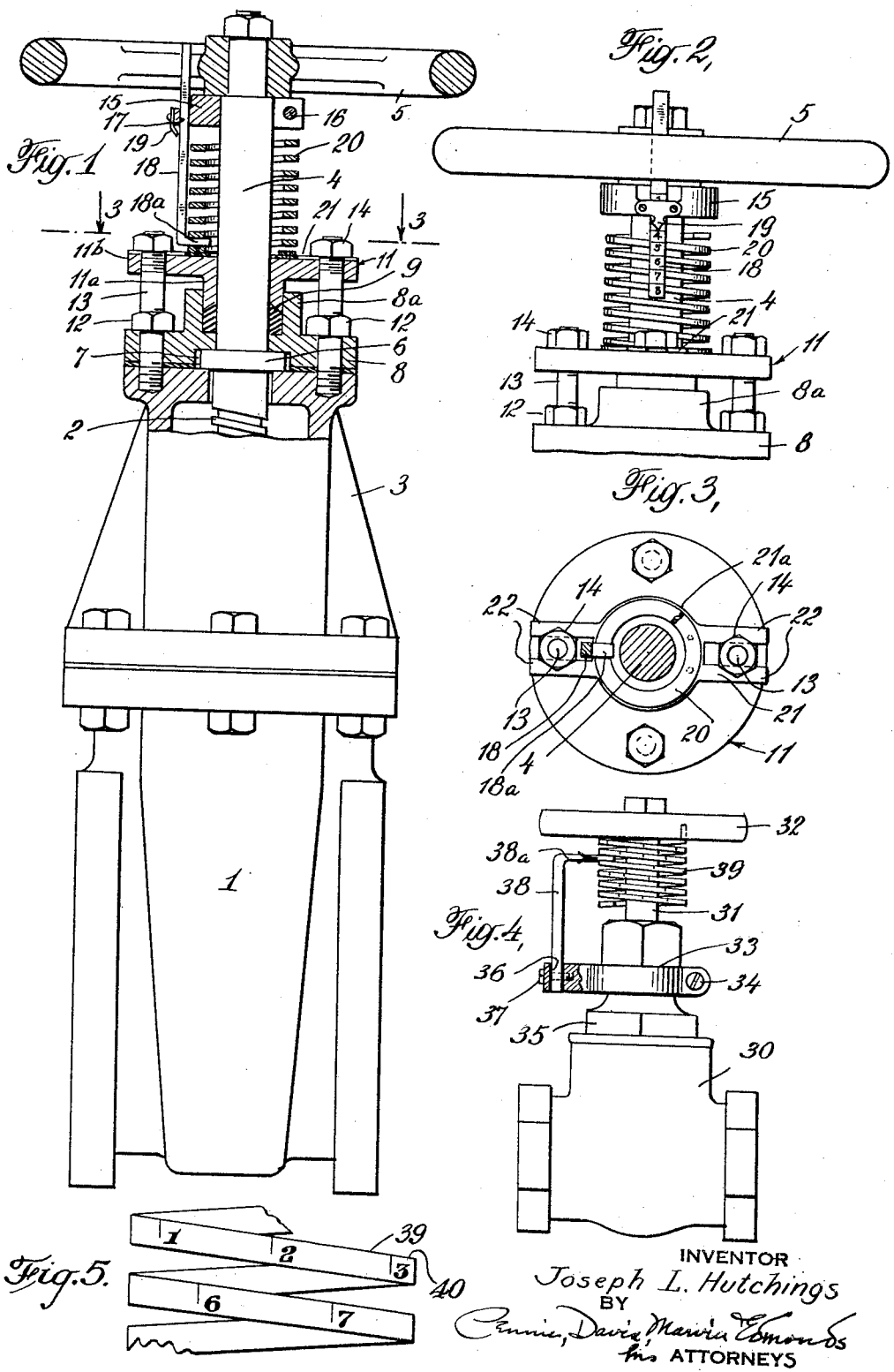
INVENTOR
Joseph L. Hutchings
BY
Ennis, Davis, Marvin Edmonds
his ATTORNEYS Patented May 9, 1933

1,907,819

UNITED STATES PATENT OFFICE

JOSEPH L. HUTCHINGS, OF OLEAN, NEW YORK

INDICATOR FOR VALVES

Application filed June 25, 1931. Serial No. 546,817.

This invention relates to valves and has as its aim to provide a valve incorporating visual indicating mechanism whereby the extent of its opening and closing may be readily determined.

In the use of hand-operated valves of the general class in which a rotatable stem projects above the valve housing and opening and closing of the valve is effected by turning the stem, it is impossible to determine the extent of opening of the valve and hence the amount of fluid passing through the line, or, more frequently, to know if the stem has been screwed completely home to close the line. The determination of this latter condition is especially important in systems transmitting combustible gases or inflammable liquids to avoid the occurrence of serious accidents resulting from leakage of the fluid past the valve.

It is an object of the present invention to provide indicating mechanism in which relative displacement between an index element and a gage element coordinated with the movement of the valve operating stem affords a means by which the workman may ascertain the amount of opening of the valve or, what is more important, insure that the valve is completely closed. The gage element may comprise a graduated scale or may merely bear a mark or other indication constituting a reference point from which the workman, by noting the distance between the index element and such reference point, may readily conclude the operative position of the valve. The term "gage" as used herein signifies an element bearing a designation, or designations, which is adapted to be brought into correspondence with an index element to denote a specific condition of the valve. More especially it is an object of the invention to provide indicating mechanism which may be easily attached to any of the conventional types of valves, such mechanism being simple in construction and positive in operation.

The invention will be better understood by reference to the attached drawing of preferred embodiments in which Figure 1 shows a typical form of gate valve equipped with the indicating mechanism of the invention; Figure 2 is a view taken at right angles to Fig. 1 showing the upper portion of the valve; Figure 3 is a horizontal sectional view taken on the line 3—3 of Fig. 1; Figure 4 is a modified form of the indicating device applied to a globe valve; and Fig. 5 is an enlarged view of the helix of Fig. 4.

In practice two types of valves are commonly employed, namely gate valves in which a flat gate or wedge is displaced endwise in a direction transversely of the line to vary the size of the valve passage, and globe valves in which a disc is lifted laterally from a seat to uncover the valve passage; in both cases the extent to which the valve passage is opened is determined by the amount of rotation imparted to the stem which projects outside the valve housing and serves as the operating means for the gage or disc. In the case of a gate valve, turning the stem usually causes simply its rotation; while turning the stem of a globe valve usually causes both rotation and axial movement of the stem. Since this action of the stems is characteristic of practically all valves now in common use, a description of the indicating mechanism of the invention as applied to these types of valves will serve to illustrate how it may be applied with equal effectiveness to others.

There is illustrated in Fig. 1 a common form of gate valve consisting of a housing 1 in which is enclosed a vertically movable gate or wedge (not shown) which is arranged to be raised and lowered by means of a screw 2 to vary the size of the valve passage and hence to regulate the amount of fluid passing therethrough. The housing is provided with a cap 3 and the upper end of the screw 2 forms a stem 4 which projects vertically through this cap. A hand-wheel 5 fitted upon the upper squared end of the stem affords a means for operating the valve. The stem is provided with a collar 6 which loosely fits within a recess 7 in the lower member of a two part stuffing box the bottom shoulder of which collar bears against the upper surface of the housing cap 3. The stuffing box surrounds the stem 4 where it emerges from the housing and comprises a lower member 8 formed with a cup 8a in which is contained a suitable packing 9 surrounding the stem and an upper member 11 including a gland 11a adapted to telescope within the cup and compress the packing about the stem. The lower member 8 of the stuffing box is affixed to the cap 3 by means of short bolts 12, and the upper member 11 is assembled with the lower member 8 by means of a pair of vertical studs 13 projecting from the lower member and receivable within openings in a flange 11b integral with the upper member. Nuts 14 threaded upon the upper ends of these studs bear against the flange 11b permitting adjustment of the gland 11a with respect to the cup 8a.

The structure which has just been described may be considered representive of a conventional form of gate valve. In this type of valve as has already been explained rotation of the stem 4 to open and close the valve results in no endwise movement of the stem. In accordance with the present invention a split ring 15 is clamped upon the stem below the handwheel 5 by means of a contracting screw 16 which extends between the adjacent ends of the split ring. The splint ring may be applied to the stem by spreading the ends of the ring apart sufficiently to pass over the stem and then tightening the contracting screw 16 until the ring binds upon the stem. Upon one side of the ring 15 is a vertical slot 17 extending parallel to the axis of the stem, and slidably disposed within this slot is a follower 18 comprising a flat metal strip of a length reaching to a position adjacent the gland 11 where its end is bent inwardly toward the stem to form a projection 18a. Upon this follower is marked a scale of numerals, as shown in Fig. 2, and cooperating with the scale is an index element constituted by a pointer 19 fastened to the ring 15 adjacent the slot 17.

Loosely surrounding the stem 4 for a portion of its length is a coil 20 comprising a flat ribbon of metal wound in the form of a helix and fastened at its lower end, as shown in Fig. 1, to a plate 21 made of sheet metal. The plate 21 rests against the upper surface of the flange 11b of the stuffing box and is provided with an enlarged central portion 21a having an opening as illustrated in Fig. 3 through which passes the stem 4. The opposite ends of the plate are bifurcated to provide pairs of legs 22 which extend on opposite sides of the studs 13 and against which bear the adjusting nuts 14. Adjacent convolutions of the helical coil are spaced apart such distance as to snugly receive between them the projection 18a on the follower 18.

It will be apparent from the structure which has just been described that upon rotation of the stem 4 the ring 15, and hence the follower 18 which is carried in the slot 17 in the ring, will rotate in unison with the stem. This in turn will cause the projection 18a extending between convolutions of the coil 20 and abutting against its opposed flat surfaces to move vertically up or down within the slot bringing different numerals under the pointer 19. The indicia on the scale may be mere arbitrary designations or may bear a definite relationship to the amount of fluid passing through the valve. As has before been suggested, in lieu of a scale a designation—or a plurality of designations—may be provided on the follower serving as a point of reference which lies under the pointer when the valve is either completely open or completely closed, and even the end edge of the follower itself may constitute such a designation. The amount of opening or closing of the valve will therefore be indicated by the distance of separation of the pointer from the appropriate designation on the follower.

While this embodiment of the invention has been described as comprising a stationary coil and a follower which partakes of the rotation of the stem, the invention nevertheless includes a construction in which the follower is stationarily supported but free for vertical sliding movement, and the coil is arranged to turn with the stem.

In Fig. 4 is illustrated a common form of globe valve and shows how the indicating mechanism may be applied thereto. In this type of valve operation of the stem to open and close the valve causes both rotative and axial movement of the stem. The housing 30 contains the disc (not shown) which covers the valve passage and the disc is moved to uncover the passage by rotating the stem 31 through a handwheel 32 on its upper end. A split ring 33 is clamped by means of a binding screw 34 upon a cap 35 surmounting the housing 30. This ring 33 is similar to the ring 15 of the construction shown in Fig. 1, being provided with a vertical slot 36. Within this slot is fastened the lower end of a follower 38 comprising an elongated metal plate or rod this follower being rigidly held by a small screw 37 intersecting the slot and follower. The follower extends in parallelism with the stem 31 for a substantial portion of its length and has its end toed in toward the stem to form an index element or projection 38a. This projection extends between adjacent convolutions of a flat metal coil 39 loosely surrounding the stem and attached at its upper end to the lower face of the handwheel 32. Instead of the follower being stamped with indicia as in the former construction, in this embodiment of the invention the coil 39 constituting the gage may be marked, for example, as shown in Fig. 5 into equal divisions to define a scale or indicia 40.

It will be apparent that when the handwheel 32 is turned to rotate the stem with an attendant endwise movement thereof, the coil carrying the scale will also partake of this compound movement. The projection 38a, on the end of the follower 38 which is stationarily supported in the ring 33, operates as a pointer to give a reading upon the scale borne by the coil to indicate the extent of opening of the valve.

While the superposition of the scale upon the upper flat face of the coil has been suggested, the scale manifestly may just as suitably be inscribed upon the outer circumference of the coil 20 in which case there will co-operate with it a longitudinal edge of the follower 18. Likewise the mechanism which has just been described may with equal effectiveness be applied to the type of valve in which no axial movement of the stem accompanies its rotation under which condition the follower 38 will be arranged for sliding movement within the slot 36 and will carry a scale or other designations which will cooperate with an index element on a fixed portion of the valve housing to indicate the position of the valve.

It will be observed that the indicating mechanism for both types of valves comprises essentially the same structure so that in manufacture the parts may if desired be made and furnished for interchangeable use with either type of valve.

I claim:

1. In a valve of the type comprising a housing and a stem projecting above the housing and adapted to be manually rotated to regulate the amount of fluid passing through the valve, a gage element rotatable with the shaft, a stationarily mounted coil surrounding the stem and a projection on the gage element extending between adjacent convolutions of the coil.

2. In a valve of the type comprising a housing and a stem projecting above the housing and adapted to be manually rotated to regulate the amount of fluid passing through the valve, relatively movable gage and index elements, and means for moving the gage element relative to the index element, said means comprising a member fixedly mounted on the stem and rotatable therewith, said member having a vertical slot slidably receiving the gage element, a stationary coil surrounding the stem, and a projection on the gage element extending between adjacent convolutions of the coil.

3. In a valve of the type comprising a housing and a stem projecting above the housing and adapted to be manually rotated to regulate the amount of fluid passing through the valve, relatively movable gage and index elements, and means for moving the gage element relative to the index element, said means comprising a ring mounted on the stem, said ring having a vertical slot slidably receiving the gage element, a stationary coil surrounding the stem, and a projection on the gage element extending between adjacent convolutions of the coil, said index element being mounted on the ring adjacent the slot.

4. In a valve of the type comprising a housing and a stem projecting above the housing and adapted to be manually rotated to regulate the amount of fluid passing through the valve, relatively movable gage and index elements, said gage element being movable coincident with rotation of the stem, and a helical band associated with the movable gage and with the valve stem, said helical band having its axis concentric with the axis of the stem, said helical band being adaptable to cause rotation of the valve stem to be indicated.

5. In a valve of the type comprising a housing and a stem projecting above the housing and adapted to be manually rotated to regulate the amount of fluid passing through the valve, relatively movable gage and index elements, one of said elements comprising a strip of material wound into a coil and bearing indicia upon its surface rotatable with the stem and the other element comprising a stationary member engaging the coil and having a pointer adapted to cooperate with the indicia on the coil.

6. In a valve of the type comprising a housing and a stem projecting above the housing and adapted to be manually rotated to regulate the amount of fluid passing through the valve, relatively movable gage and index elements, said gage element comprising a flat helical member rotatable with the stem and bearing indicia upon its upper surface, and the index element comprising a stationary member extending between adjacent convolutions of the helical member and overlying the indicia.

7. In a valve of the type comprising a housing and a stem projecting above the housing and adapted to be manually rotated to regulate the amount of fluid passing through the valve, relatively movable scale and index elements, said scale element comprising a flat helical member rotatable with the stem and bearing indicia on its upper surface, a ring attachable to and detachable from the valve and an index member supported by the ring in parallelism with the stem and having its free end bent to extend between adjacent convolutions of the helical member and overlying the indicia.

In testimony whereof I affix my signature.

JOSEPH L. HUTCHINGS.